Aug. 8, 1950     F. T. BARR     2,518,270
REACTOR

Filed March 29, 1945     6 Sheets-Sheet 1

Frank T. Barr   Inventor
By _____ Attorney

Aug. 8, 1950 F. T. BARR 2,518,270
REACTOR
Filed March 29, 1945 6 Sheets-Sheet 2

Frank T. Barr Inventor
By  Attorney

Aug. 8, 1950     F. T. BARR     2,518,270
REACTOR

Filed March 29, 1945     6 Sheets-Sheet 5

Frank T. Barr Inventor
By P. L. Young Attorney

Aug. 8, 1950  F. T. BARR  2,518,270
REACTOR

Filed March 29, 1945  6 Sheets-Sheet 6

Frank T. Barr Inventor
By ___ Attorney

Patented Aug. 8, 1950

2,518,270

UNITED STATES PATENT OFFICE 2,518,270

REACTOR

Frank T. Barr, Summit, N. J., assignor to Standard Oil Development Company, a corporation of Delaware Application March 29, 1945, Serial No. 585,471

2 Claims. (Cl. 23—288)

1

This invention relates to a method and apparatus for controlling the temperature of endothermic or exothermic reactions in the presence of a powdered, fluidized catalyst. More particularly, this invention relates to the passage of a stream of a heating or cooling fluid in a heat exchange relation with a fluidized mixture of catalyst and reactants and involves the use of an improved type of heat exchange elements in the reaction zone.

It is known to control the temperature of catalytic reactions by the circulation in heat exchange relation with a catalyst and the compounds passing therethrough of heat transfer media at such temperature and at such rates as to maintain the temperature of reaction within the desired range. In the case of exothermic reactions, these heat exchange media are capable of absorbing the excess heat without cooling the reaction chamber below the desired reaction temperature. Corresponding use of such heat exchange media can be made in endothermic reactions.

Temperature control of this type is applicable in both fixed bed and fluid type operations; however, the problem of proper design is much more difficult to solve with fluid bed reactors than in the case of fixed bed, since the catalyst and reactants continually flow around the individual heat exchange elements with resultant erosion and failure of the elements. Furthermore, fluid bed reactors are normally designed with a sufficient amount of free surface above the bed to reduce entrainment of solids in the outgoing vapors to a minimum. It is not necessary therefore to provide the free space above the bed with the heat exchange necessary in the bed itself. In view of the possibility of failure of the heat exchange elements, it is necessary to provide easy means for replacing the part that has failed.

The usual type of heat exchange tube assembly with external tube sheets running either vertically or horizontally through a reactor does not lend itself advantageously to use in fluid beds because of the large openings required in the vessel if even distribution of cooling surface throughout the reaction space is to be obtained. In addition, with vertical tubes complications arise in providing gas distribution facilities at the bottom and disengaging space at the top of the fluid bed; with horizontal tubes it is difficult to design tube bundles which will distribute cooling surfaces satisfactorily.

Accordingly, the principal object of the present invention is to provide heat exchange elements in a fluid bed reactor which are arranged to give

2 relatively even distribution of the surface, but are easily accessible and capable of being easily replaced in case of failure.

It is a further object of this invention to provide heat exchange elements for use in fluid bed type reactors which afford the maximum amount of heat exchange surface and at the same time offer the minimum amount of interference to the circulation of the catalyst in the reactor.

The foregoing and other objects are achieved, in accordance with the invention, by arranging the heat exchange elements in separately removable bundles of standard size and shape and providing individual feed and discharge manifolds for each bundle.

To the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed. In the drawings:

Figure 2:
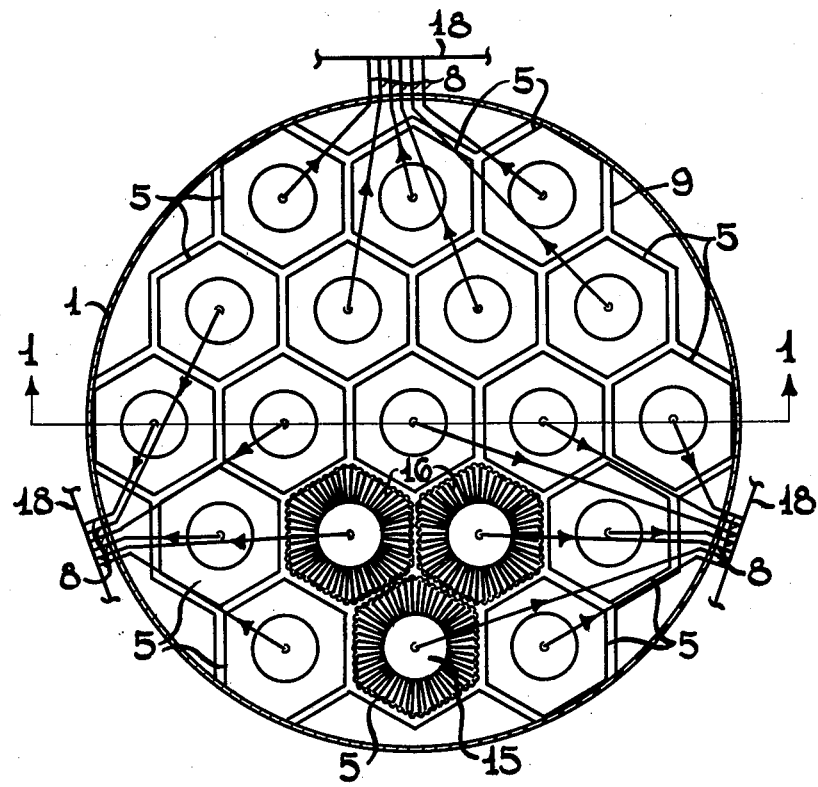
Figure 2 is a plan view of a reactor taken along line 2—2 of Figure 1 illustrating the preferred method of arranging the heat exchange elements in the reactor.
Figures 5, 6:
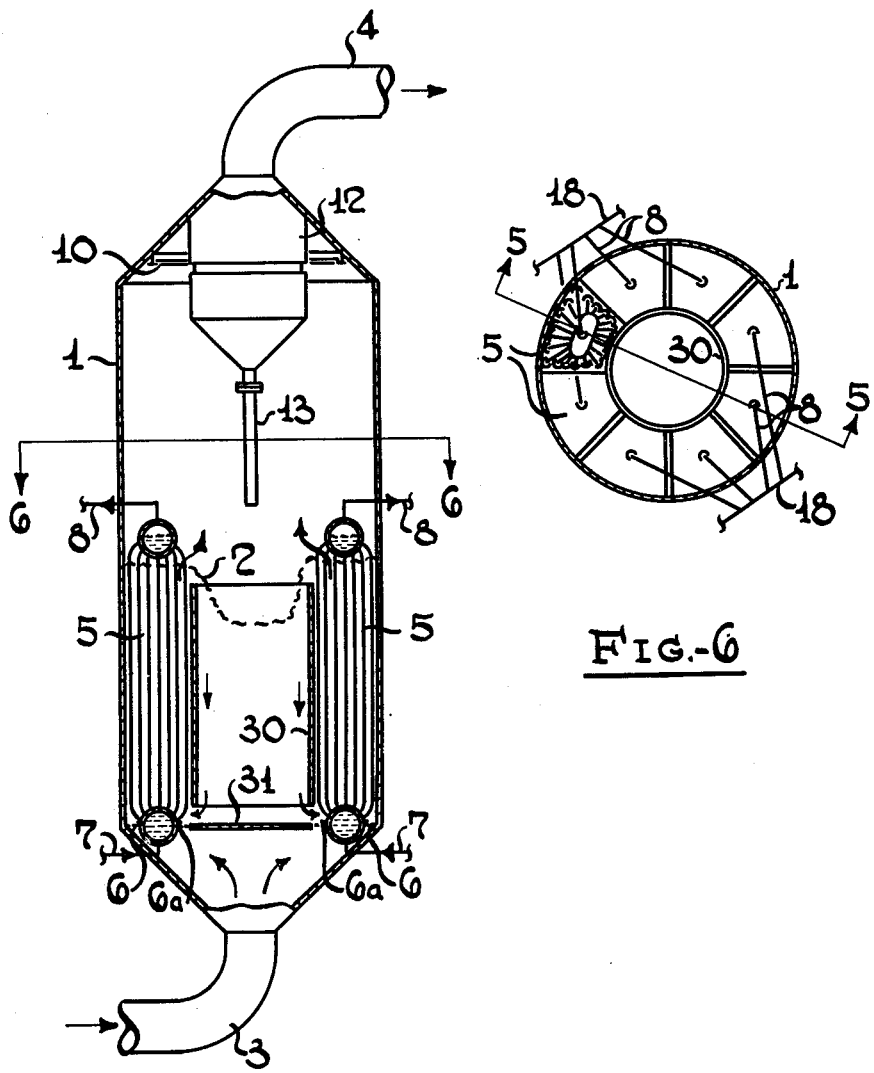
Figure 5 is a sectional elevation, taken along line 5—5 of Figure 6, of a reactor employing the novel heat exchange elements in combination with a draft tube.
Figure 6 is a plan view of the reactor of Figure 5 taken along lines 6—6.

In the form of the invention illustrated in the drawings, numeral 1 represents a catalytic reactor of the fluid bed type filled with fluid catalyst having a level 2 and provided with line 3 for introducing reactants and line 4 for withdrawing products. Higher or lower catalyst levels may also be used, subject to limitations hereinafter described. Within the catalyst bed there is provided a plurality of tubular heat exchange bundles 5, resting on supports 6a, at approximately the same level as gas-distributing grid 6. These bundles are adapted to carry any type of heat exchange medium and are preferably constructed in hexagonal cross section as shown in Figure 2 so as to occupy the maximum space within the reactor. Each bundle is provided with individual feed or discharge lines 7 and 8, connected to a common external manifold 17 and 18, respectively, as shown in Figs. 2 and 5. Valves may be placed in the external sections of 7 and 8 to permit isolation of individual bundles at will.

Whether lines 7 and 8 are feed or discharge lines for the heat exchange medium depends on whether the bundles 5 are being used in an endothermic or exothermic reaction. If the reaction is endothermic, it would be preferable to introduce the heat exchange medium into the top of the bundle and remove it through the bottom. In exothermic reactions, the reverse would generally be the case.

Since the hexagonal shape of the bundles 5 does not allow all the space within the reactor to be occupied with heat exchange elements, baffles 9 are provided within such space so as to reduce or essentially eliminate catalyst volume in this otherwise free space. Of course, it is also possible to design the heat exchange bundles near the wall in such shape as to occupy this space, but additional shapes would be required and the unitary nature of the bundles interfered with.

In the upper portion of the reactor, within the free space above the catalyst bed there are provided monorails 10 and opening 11 for installing and removing the individual bundles and a cyclone separator 12 for separating catalyst from effluent vapors. Separator 12 is directly connected with product line 4 and is provided with pipe 13 which discharges into the catalyst bed below level 2.

Figure 3:
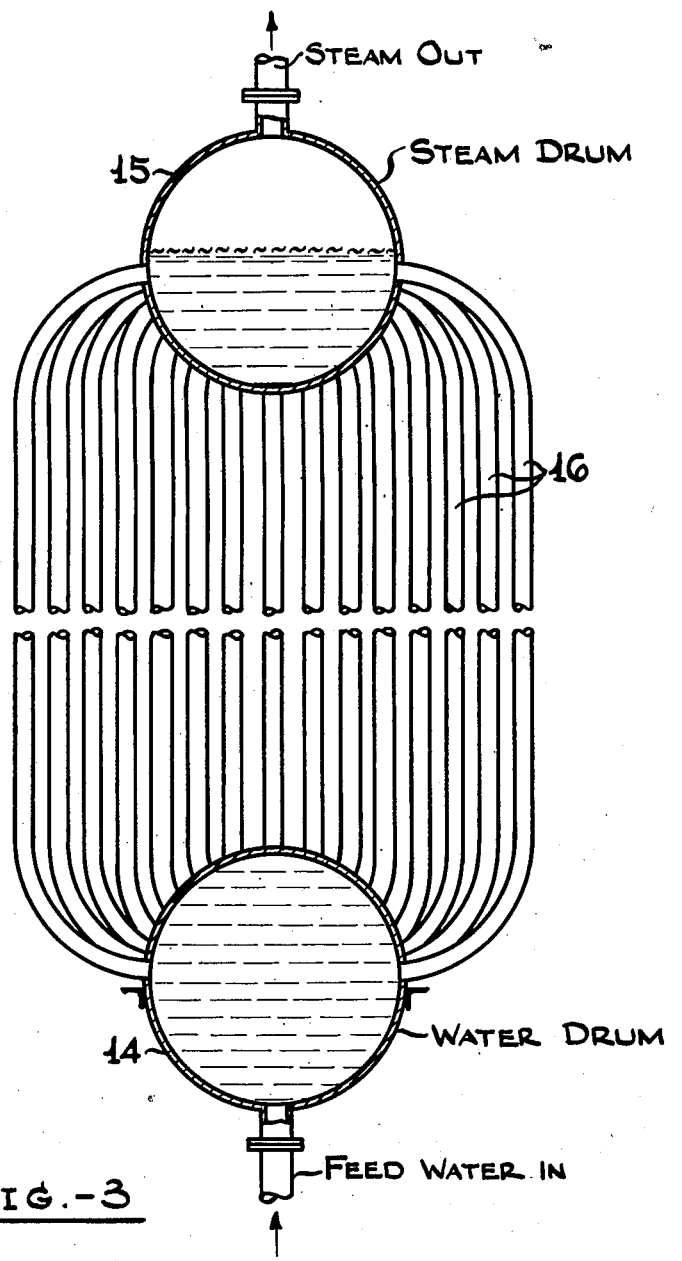
Figure 3 is an enlarged view in vertical section of a single bundle of the novel heat exchange elements of the present invention.

Referring now to Figure 3, the individual heat exchange bundle is shown to consist of a lower drum 14 and an upper drum 15, provided with a plurality of connecting tubes 16. In case internal circulation of the heat exchange fluid is desired, one or more of the tubes, preferably near the center of the bundle, may be larger than the others, thereby decreasing the surface to volume ratio in that tube relative to the other tubes and setting up conditions which will develop a thermal siphon or gas lift. The lower drum 14 is provided with feed or discharge line 7 and the upper drum 15 is provided with feed or discharge line 8. These lines, as shown in Figure 2, converge from each of the bundles in the reactor to common manifolds 17 and 18, respectively. The individual tubes 16 are spaced apart so as to allow catalyst particles circulating below the level 2 in the reactor 1 to pass there-between without unduly restricting the flow thereof.

Figure 1:
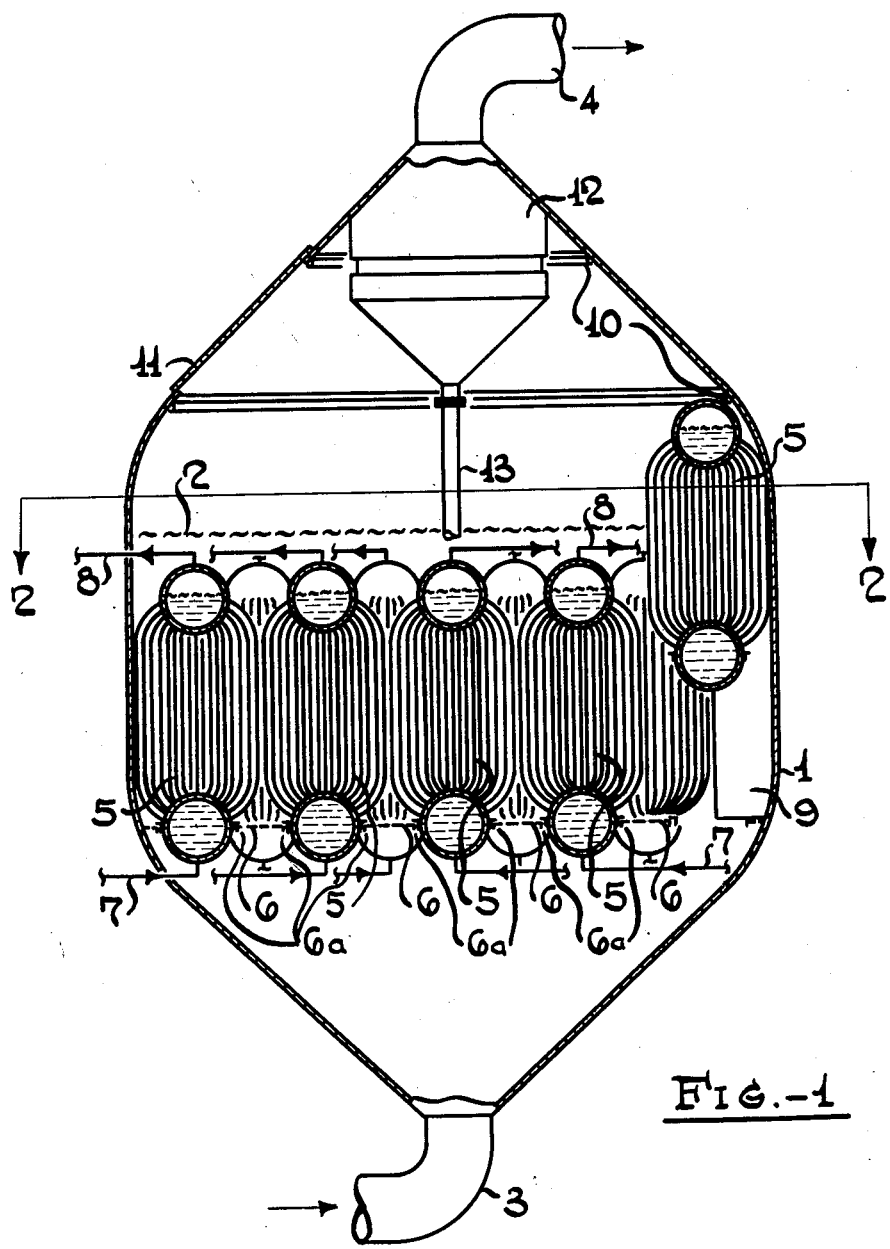
Figure 1 is a sectional elevation, taken along line 1—1 of Figure 2, of a reactor employing the novel heat exchange elements of the present invention.

When it is desired to remove a bundle 5 from the reactor, feed lines 7 and discharge lines 8 are disconnected and the bundle is hoisted by means of monorails 10 placed in the top of the reactor and conveyed to opening 11 and withdrawn as shown in Figure 1.

Figure 4:
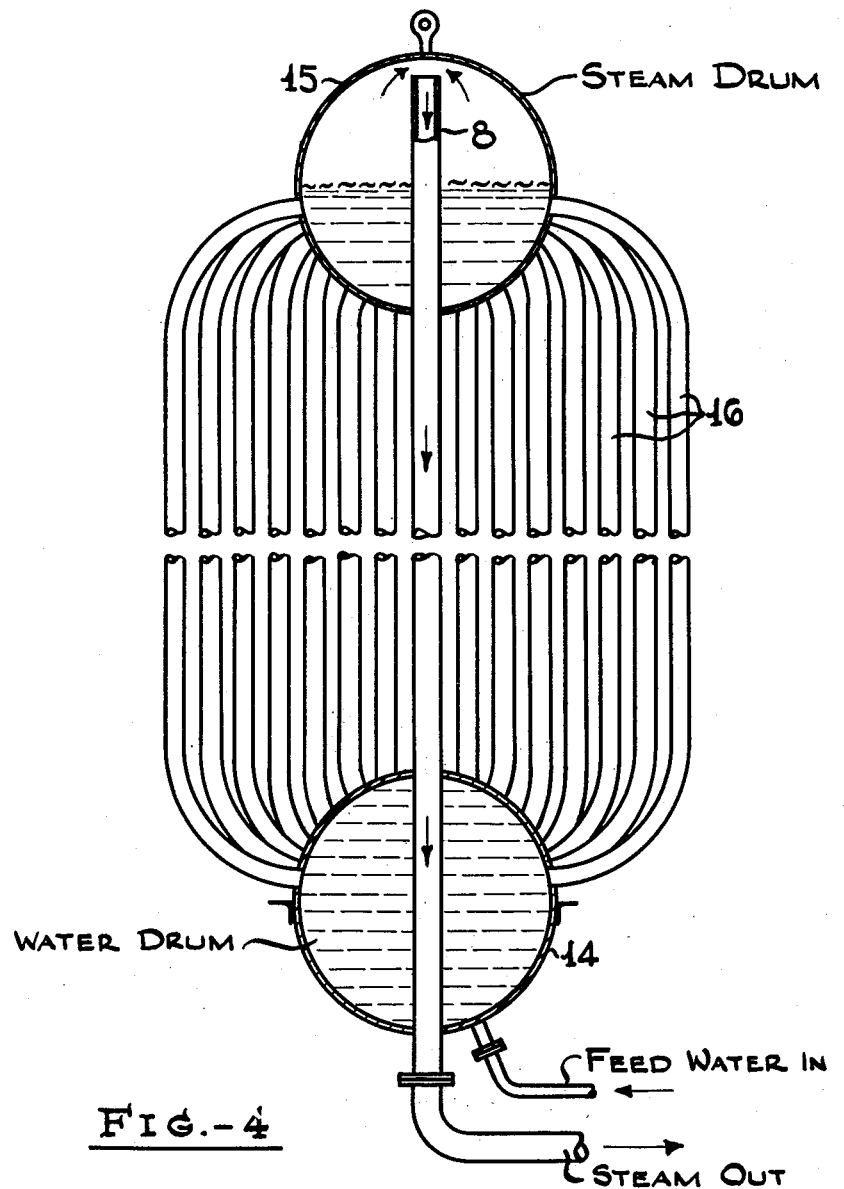
Figure 4 is an enlarged view in vertical section of a single bundle of the novel heat exchange elements of this invention illustrating an alternative method of arranging the feed and discharge lines.

Figure 4 illustrates another embodiment of the heat exchange element illustrated in Figures 1, 2 and 3 in which there is provided an improved arrangement of the feed and discharge lines to the bundles. When using the arrangement illustrated in Figures 1, 2 and 3, the removal of one of the bundles from the reactor necessitates the taking apart not only of the connection in the top of the bundles but also necessitates the dismantling of the line 8 from this bundle and, in many cases, from nearby bundles as well. Furthermore, line 8 is in a location where it is subject to the abrasive action of the catalyst.

The embodiment illustrated in Figure 4 overcomes these disadvantages by arranging both the line 7 and the line 8 at the bottom of the bundle. According to this embodiment, line 8 comprises an open-ended pipe extending from the vapor space in the drum 15 downward through that drum and thence through the limits of the bundle cross section, preferably along the line following the vertical axis of the bundle and thence downwardly through the lower drum 14, but not in open communication therewith and finally extending to the outside below drum 14 and thence to the outside of the reactor where it connects with the common manifold 18. This modification facilitates installation and maintenance of heat exchange bundles and allows the replacements to be made more quickly.

Figures 5 and 6 illustrate still another embodiment of this invention in which a draft tube is used for circulating the catalyst over the heat exchange elements. Referring to these figures, a tube 30 open at top and bottom is centrally positioned in reactor 1. The heat exchange elements 5 are annularly located around this central tube. That portion of grid 6 beneath the bottom opening of the tube 30 is solid as at 31 and acts as a baffle to direct the incoming gas from line 3 around the elements 5. This design is especially adaptable to operations in which the catalyst bed height is large compared to the diameter, for example 2:1 or greater. Heat exchange elements may be placed in the tube 30 if desired rather than in the annular section as shown. Furthermore, the flow of the catalyst may be up through the tube and down in the annular space or vice versa.

Heat exchange elements of this invention are particularly suited for use as cooling elements in exothermic reactions such as the synthesis of hydrocarbons from carbon monoxide and hydrogen.

Figure 7:
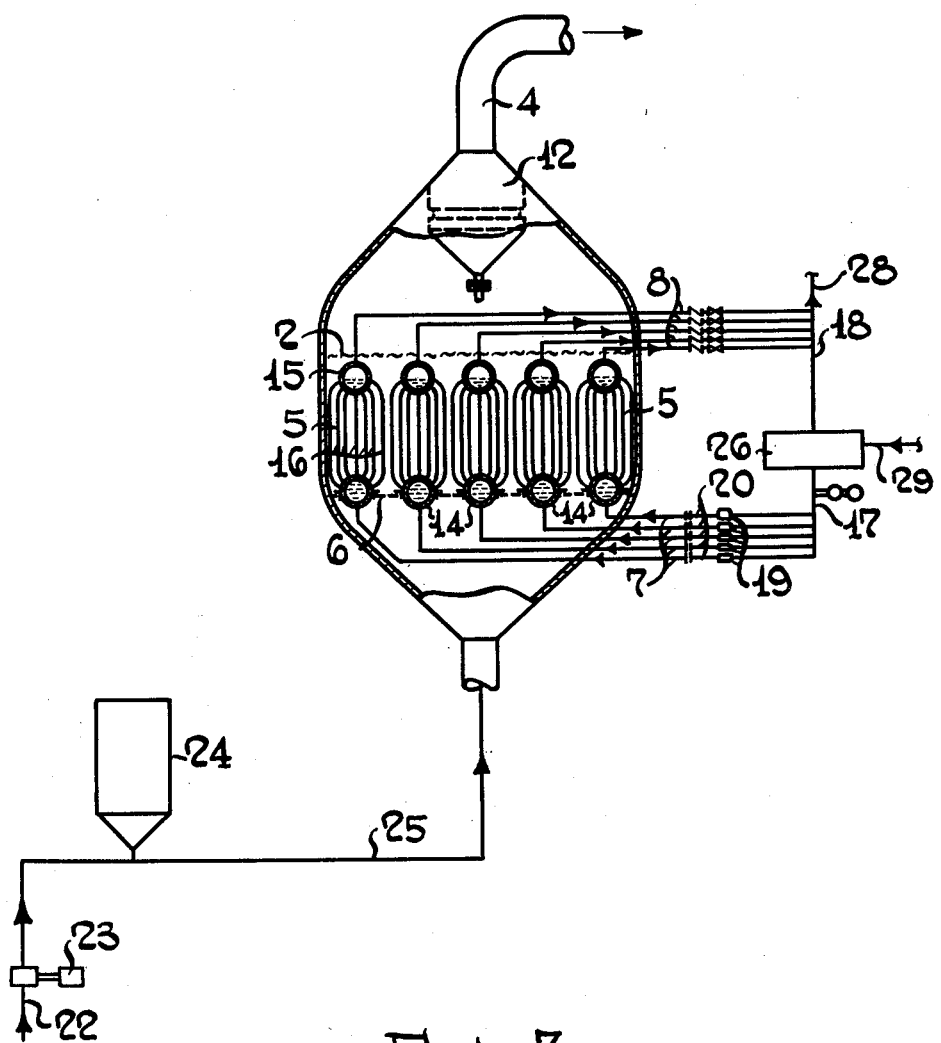
Figure 7 is a diagrammatic illustration of the use of the novel heat exchange elements of this invention in a process for synthesizing hydrocarbons.

Figure 7 illustrates one method for using the novel arrangement of heat exchange elements of this invention in such a synthesis reaction.

For purposes of illustration, it is assumed that the feed gases comprise hydrogen and carbon monoxide and that the reaction is conducted under conditions to produce hydrocarbon constituents containing more than one carbon atom in the molecule.

Referring, therefore, to Figure 7, synthesis gases are introduced into the system by means of line 22, compressed in compressor 23, and introduced into reactor 1 through line 25. Catalyst may be added from hopper 24 as necessary to build up or maintain the fluid catalyst bed level in reactor 1.

Reactor 1 is maintained at a temperature between 350° and 700° F., depending on the catalyst and conditions used, by means of heat exchange bundles 5, arranged in the reactor 1 in the manner illustrated in Figures 1 and 2 but here shown only in schematic form for purposes of simplification.

The catalyst suspension is introduced into the lower portion of an expanded zone representing the reaction vessel through distribution grid 6 and is passed upwardly through the reaction zone and circulates past individual elements 16 of bundles 5. Because of the greatly reduced gas velocity, the more dense catalyst particles will tend to settle out from the less dense suspending gases or vapors and the catalyst concentration in the reaction zone will, therefore, be substantially greater than in the effluent gases passing to separator 12 and leaving the reactor through line 4. It is also generally preferred to pass the gases and/or vapors upwardly through the reaction zone at such a rate that the solid catalyst particles and gases and/or vapors form a dense phase mass which acts as if it had a level 2 similar to a boiling liquid. The catalyst within this mass has a concentration much more dense than the gas and/or vapors above the level. In practice, there is a region of demarcation between these two phases which produces the level. Level 2 is not quiescent, but is under more or less violent agitation similar to the surface of a boiling liquid. The formation of such a dense phase mass with its pseudo level occurs at outlet gas velocities which vary depending on the relative properties of the catalyst and the supporting vapors but in general do not exceed 1½ ft./sec. Although the level furnishes a point of sudden decrease in catalyst density, it is understood that the density within this dense phase may change toward the bottom.

The reaction products and catalyst suspended therein are passed through catalyst separation zone 12 in the top of the reactor 1 and the gaseous products free from catalyst are withdrawn through line 4 while separated catalyst is returned to the dense phase through line 13.

A cooling agent, such as water, is pumped from storage tank 26 through manifold 17 and lines 7 into the headers 14 of each of the bundles 5. Thence the water circulates upwardly through the individual tubes 16 into headers 15. During this upward passage, the water is at least partially, if not completely, converted into steam, thereby removing reaction heat from the catalyst mass circulating around the tubes 16. The exact amount of heat exchange realized by this passage of the water through tube 16 is itself controlled by the pressure held on the steam produced, a higher pressure raising the boiling temperature of the water and thereby decreasing the temperature differential available for transfer of heat through the tubes. Steam is withdrawn from header 16 through lines 8 and manifold 18 whence it is available for use for power or heat as desired through line 28. Boiler feed water may be added to storage tank 26 through line 29. Boiler feed lines 7 are provided with controls 19 for maintaining suitable boiler water level in drum 15, and flow restricting orifices 20 prevent excessive flow of water should a tube break and allow loss of the contents of the bundle into the reaction space. Individual steam lines 8 are provided with check valves 21, so as to prevent backflow of steam under similar conditions. Orifices 20 may be connected to an alarm or control system (not shown) in order to indicate the pressure and location of abnormally high flow of feed water to the cooling elements and, if desired, to automatically stop the feed to the offending bundle. If desired, any other type of vaporizing heat exchange fluid may be used, for example, diphenyl. Alternatively non-vaporizing liquids may be pumped through the heat exchange units at such a rate as to absorb the reaction heat as sensible heat of the cooling fluid within a satisfactorily narrow temperature range; such materials may comprise gas oils, low melting alloys, etc.

The spacing of the heat transfer elements 16 is arranged so as to avoid undue interference with satisfactory mixing of the powdered catalyst in the fluid bed. According to the present invention it has been found that the cooling elements 16 should not be spaced closer than ⅓ their diameter nor to occupy more than 65% of the total cross sectional area of the reactor, and in any event should not be spaced closer than about 0.4 of an inch. It is preferable, however, that the individual tubes should not be spaced closer than ⅔ of a diameter or made to occupy more than 40% of the total cross sectional area of the reactor, while the minimum spacing should preferably not be less than ½ inch. While maximum spacing will be limited by the necessity for installing at least a minimum amount of cooling surface, it is desirable to secure constant temperature in the catalyst bed by providing that no portion of the catalyst space should be more than 2, or at most, 4 feet from a heat transfer element and that average or greater turbulence in the fluid bed should be maintained at such points. For example, the fluid bed level should not be carried more than 2 to 4 feet above the cooling zone. By observing the tube clearances given above, it will be possible to operate the reactor when a group of tubes occupying a zone as much as ½ to ¾ as wide as the fluid bed is deep is taken out of service.

The individual heat transfer bundles 5 are shaped so as to occupy as much of the entire reactor cross section as possible. It has been found that hexagonal bundles realize this to the greatest degree since groups of 7, 19, 37, 61 . . ., can be arranged to take up 83% of the total reactor cross section. It is also possible to use square bundles, which can be arranged in groups 37, 52, 57, 69 . . . and which will occupy 80 to 83% of the cross section but any smaller numbers will result in less efficient use of the reactor space.

While we have herein illustrated and described one embodiment of our apparatus with considerable particularity, we do not desire to limit ourselves thereto or to the carrying out of our method by the use of apparatus of that character alone, as it will be evident that various changes may be made in the details thereof, if desired, without departing from its principal features and characteristics and from the spirit and scope of our invention as defined in the appended claims.

The nature and objects of the present invention having been thus described and illustrated, what is claimed as new and useful and is desired to be secured by Letters Patent is:

1. In combination with a reaction vessel adapted to contain a body of a finely divided, fluidizable solid material and including conduit means for introducing a gaseous reactant into the vessel for fluidizing and circulating therein a body of finely divided solid material contained in the vessel, and separator conduit means for withdrawing reacted gaseous material from the fluidized body of solid material while separating said solid material therefrom and returning the separated material to the vessel, a means for controlling temperatures within such a body of fluidized solid material in said vessel, comprising a plurality of individually removable heat exchange units disposed vertically in close proximity to one another so as normally to be submerged substantially within a body of finely divided solid material contained in the vessel, each of said units consisting of upper and lower header members vertically spaced one from another and interconnected by means of a plurality of tubular heat exchange elements opening at either end into the respective header members peripherally of the lower and upper half portions thereof respectively to form a bundle having a diameter substantially greater than that of the header members therefor, individual upper and lower conduit means opening into the upper and lower header members respectively, said conduit means extending outwardly through a wall of said vessel into corresponding manifolds therefor exteriorly of said vessel, and an annular track mounted interiorly of the vessel above said units adapted to movably support hoisting means for removal of individual heat exchange units.

2. In combination with a reaction vessel adapted to contain a body of a finely divided, fluidizable, solid material and including conduit means for introducing a gaseous reactant into the vessel for fluidizing and circulating therein a body of finely divided solid material contained in the vessel, and separator conduit means for withdrawing reacted gaseous material from the fluidized body of solid material while separating said solid material therefrom and returning the separated material to the vessel, a means for controlling temperatures within a body of fluidized solid material in said vessel comprising a tubular circulator element supported vertically and concentrically of said vessel for substantial submergence in a body of said material contained in the vessel, forming an annular space between said element and the vessel walls, a plurality of individually removable heat exchange units disposed vertically of said annular space in closely spaced relation one to another, substantially filling said annular space and disposed for substantial submergence with said element in a body of fluidized solid material contained in said vessel, each unit consisting of upper and lower header members vertically spaced one from another and interconnected by a plurality of tubular heat exchange elements opening at either end into one of said header members peripherally of an upper and lower half portion of the lower and upper header members respectively, to form a bundle having a diameter substantially greater than that of said header members, and individual upper and lower conduit means opening into the upper and lower header members respectively, said individual conduit means extending outwardly through the wall of said vessel into corresponding manifolds therefor exteriorly of said vessel, a baffle member for the lower end of said circulator element disposed in vertically spaced parallel relation to the lower end thereof, extending radially beyond said element into peripherally spaced relation to the lower header members of said heat exchange units, and an annular track mounted interiorly of the vessel above said units, adapted to movably support hoisting means for removal of individual units.

FRANK T. BARR.

REFERENCES CITED

The following references are of record in the file of this patent:

UNITED STATES PATENTS

| Number | Name | Date |
| --- | --- | --- |
| 2,004,758 | Jaeger | June 11, 1935 |
| 2,354,546 | Reeves | July 25, 1944 |
| 2,367,351 | Hemminger | Jan. 16, 1945 |
| 2,428,872 | Gunness | Oct. 14, 1947 |
| 2,434,537 | Barr et al. | Jan. 13, 1948 |